Patented Aug. 18, 1953

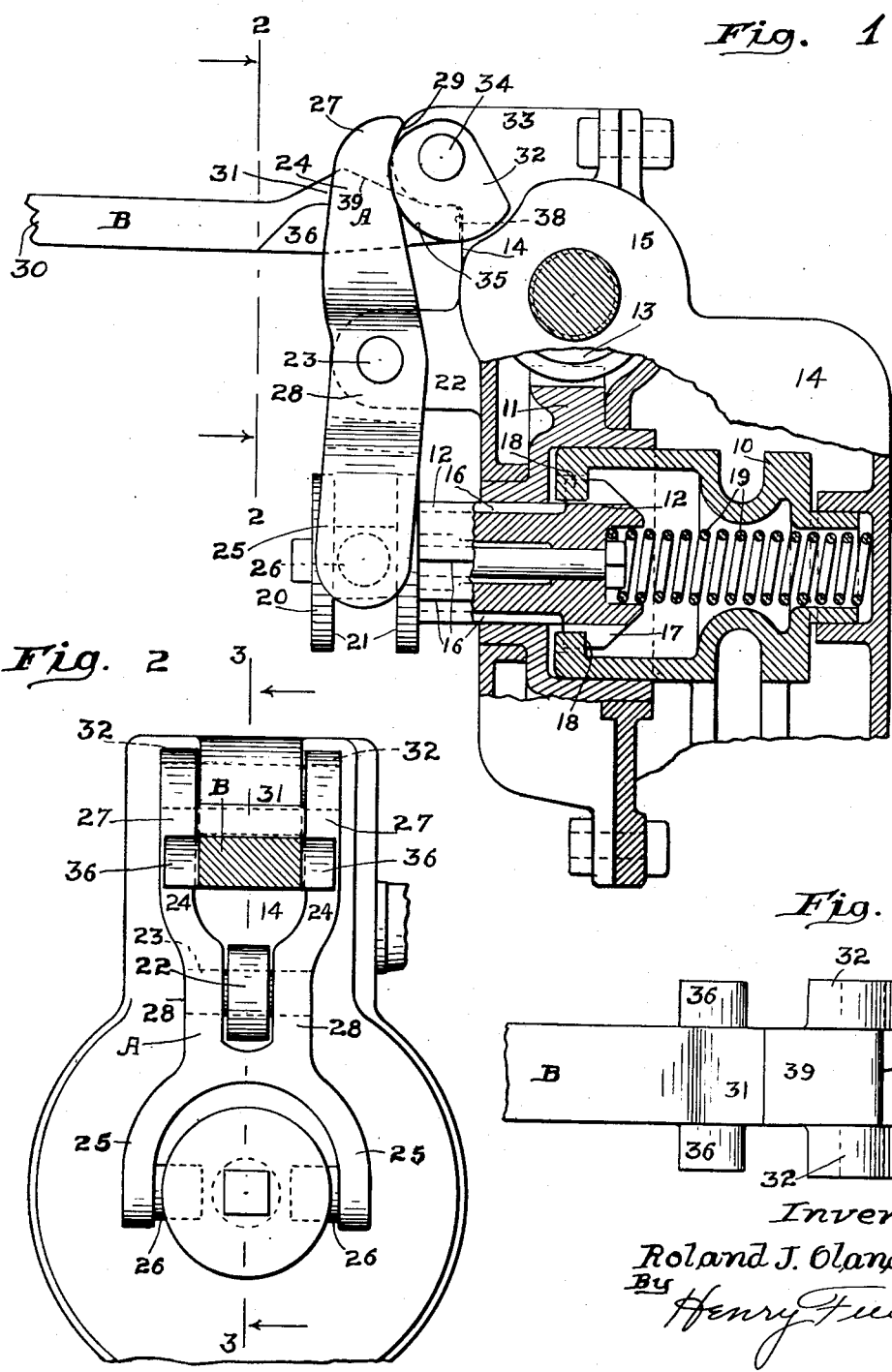

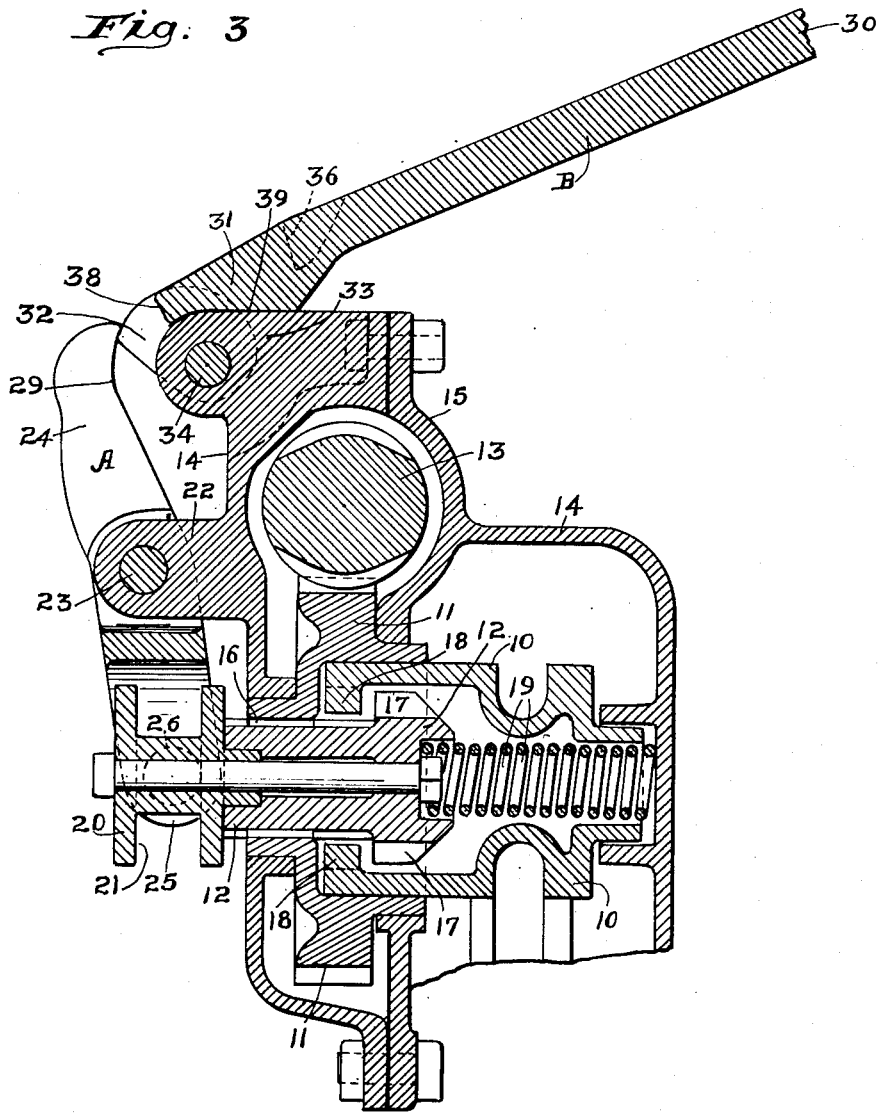

2,648,984

UNITED STATES PATENT OFFICE 2,648,984

CLUTCH ACTUATING MEANS FOR HAND BRAKES OF RAILWAY CARS

Roland J. Olander, Chicago, Ill., assignor to W. H. Miner, Inc., Chicago, Ill., a corporation of Delaware Application August 5, 1950, Serial No. 177,808

6 Claims. (Cl. 74—96)

This invention relates to improvements in lever actuated clutch shifting means for geared hand brakes for railway cars.

One object of the invention is to provide in a hand brake mechanism of the gear driven, power multiplying type, comprising the usual rotary chain winding member and rotary driving gear member connected by a clutch element, simple and efficient means for shifting the clutch element including an actuating lever, which, when thrown to either clutch engaging or disengaging position, holds the clutch element against being accidentally shifted.

A more specific object of the invention is to provide in a hand brake mechanism comprising a chain winding drum, a rotary driving member for the drum, a sliding clutch element rotatable in unison with the driving member and having clutch teeth engageable with clutch teeth on the drum, means for shifting the clutch element, comprising an upright shifting lever and an actuating lever, the shifting lever being pivoted between its ends, and having its lower end operatively connected to the clutch element, the actuating lever being swingingly supported above the shifting lever for pivotal movement at its lower end, and having means thereon engageable with the shifting lever to actuate the same, comprising a cam member at the pivoted end of the actuating lever and a lug outwardly of and spaced from said cam member, said cam member and lug being respectively engageable with the upper end of the shifting lever to move the same in reverse directions to disengage the clutch element from and engage the same with the winding drum.

Other objects of the invention will more clearly appear from the description and claims hereinafter following.

In the accompanying drawings forming a part of this specification, Figure 1 is a front elevational view, partly broken away, of a worm gear driven hand brake mechanism, illustrating my improvements in connection therewith, the housing for the mechanism being broken open and the mechanism therein being shown in vertical section. Figure 2 is a vertical sectional view, corresponding substantially to the line 2—2 of Figure 1. Figure 3 is a vertical sectional view, corresponding substantially to the line 3—3 of Figure 2, but showing the parts in different positions. Figure 4 is a broken plan view of the actuating lever shown in Figure 1.

My improved clutch actuating means is illustrated in the drawings as employed in connection with a well-known type of worm gear driven hand brake mechanism, comprising a chain winding drum 10, rotatable about a horizontal axis, a worm wheel 11 in axial alignment with the drum, a sliding clutch element 12 operatively connecting the worm wheel and drum, and a worm 13 meshing with the worm wheel, the latter being actuated by the usual hand wheel, not shown. The operating parts of the mechanism are mounted within the usual housing, which is indicated by 14, the worm 13 being rotatably supported in an upstanding extension 15 of the housing. As shown in Figure 1, the left hand end of the drum 10 is rotatably supported in the worm wheel 11 and the clutch element 12 is slidingly supported in the worm wheel, being splined to the latter, as indicated at 16, for rotation in unison therewith and lengthwise sliding movement with respect to the worm wheel and drum. The clutch element and drum have cooperating clutch teeth 17 and 18, and a spring 19 yieldingly urges the clutch element to its operatively engaged position. The clutch element 12 protrudes outwardly beyond the left hand side of the housing 14, as shown in Figure 1, and is provided with a spool member 20 at its outer end, which is fixed thereto, for rotation in unison therewith. The spool member 20 is provided with the usual annular groove 21.

In carrying out my invention, I provide broadly a shifting lever A, which is engaged with the spool member 20 of the clutch element 12, and an actuating lever B having operative engagement with the shifting lever.

The shifting lever A is located above the spool member 20 of the clutch element 12, being supported on an outwardly extending lug 22, projecting laterally from the left hand end of the housing 14, as seen in Figure 1. The lever A is arranged upright, being swingingly supported between its ends on a pivot pin 23 extending through the lug 22 and said lever. The lever A thus presents an upstanding top arm 24 and a depending bottom arm 25. The depending arm 25 is forked, as shown most clearly in Figure 2, and is engaged over the spool member 20, the spaced sections of the fork thereof being provided with inwardly projecting trunnions 26—26 extending into the groove 21 of said spool member 20. The top arm 24 of the lever A is also forked, as shown in Figure 2, said forked portion comprising a pair of laterally spaced fingers 27—27, which have their lower end sections offset inwardly, as indicated at 28—28. The sections 28—28 embrace the supporting lug 22 at opposite sides, and have aligned openings therein accommodating the opposite ends of the pivot pin 23. The upper ends of the fingers 27—27 are shaped as shown in Figure 1, being pointed at their outer ends. The left hand side edge of each finger 27, at the outer end thereof, is provided with a concave face 29.

The actuating lever B comprises an elongated handle portion 30 and a thickened head portion 31 at the inner end of said handle portion. The head portion 31 includes laterally spaced cam wings 32—32, which are integral with said head and are offset laterally from the opposite sides of said main body portion of said head. The lever B is swingingly supported at its lower end on an outstanding lug 33 at the left hand side of the upstanding extension 15 of the housing 14 by means of a pivot pin 34, extending through said lug 33 and the spaced cam wings 32—32 of said lever B. The cam wings 32—32 present rounded cam faces 35—35, which are engageable with the concave faces 29—29 of the arm 24 of the lever A. At the inner end of the head 31, that is, at the point where the handle portion 30 of the lever B merges with the head 31, laterally outstanding lugs 36—36 are provided at opposite sides, which are engageable with the rear edges of the spaced fingers 27—27 of the arm 24 of the lever A, when the former is swung to the position shown in Figure 1. As will be evident, when the lever B is in the position shown in Figure 1, the head 31 thereof is accommodated between the fingers 27—27 of the arm 24 of the lever A. Downward movement of the lever B is positively limited by engagement of the flat end face 38 of the lever with the side of the housing 14, as shown in Figure 1.

In Figure 1, the clutch element 12 is shown as operatively engaged with the teeth of the drum 10. In this position of the parts, the lever B is horizontally disposed, as shown in Figure 1, with the lugs 36—36 buttressed against the arm 24 of the shifting lever A to hold the clutch element engaged. As will be evident, in this position of the parts, the weight of the lever B positively holds the arm 24 of the shifting lever A against swinging movement toward the left, thereby maintaining the clutch element 12 in its engaged position.

To disengage the clutch element 12, the lever B is swung upwardly and toward the right to the position shown in Figure 3, thus, through the action of the cam wings 32—32 camming the upper end of the shifting lever A toward the left to shift the clutch element 12 to the right to its disengaged position, as shown in Figure 3. Disengagement of the cam wings 32—32 of the lever B from the lever A, in its movement to the right, that is, to the position shown in Figure 3, is positively prevented by engagement of the flat abutment face 39 of the lever with the housing 14.

I claim:

1. In a shifting mechanism, the combination with a lever pivoted between its ends, said lever having one end connected to an element to be shifted; of a second lever pivoted at one end and having a cam head at said pivoted end engageable with one side of the other end of said first named lever for swinging the latter in one direction; and a lug on said second named lever between the ends of the same engageable with the opposite side of said other end of said first named lever for swinging the same in reverse direction.

2. In a shifting mechanism, the combination with an upright lever pivoted between its ends, said lever having its lower end connected to an element to be shifted; of a second lever above said first named lever, said second named lever being pivoted at its lower end; a cam head at said lower end of said second named lever engageable with one side of the upper end portion of said first named lever for swinging the same in one direction; and a lug on said second named lever spaced from said cam head and engageable with the oposite side of the upper end portion of said first named lever for swinging the same in reverse direction.

3. In a shifting mechanism, the combination with an upright lever pivoted between its ends having an upstanding top arm and a depending bottom arm, said bottom arm having its lower end connected to an element to be shifted; of a second lever above said first named lever, said second named lever being pivoted at its lower end; a cam on said lower end of said second named lever engageable with one side of the upper end of said top arm of said first named lever for swinging the same in one direction; and a lug on said second named lever spaced from said cam and engageable with the opposite side of said top arm of said first named lever for swinging the same in reverse direction.

4. In a shifting mechanism, the combination with a lever pivoted between its ends, said lever having trunnions at one end engaged with an element to be shifted; of a second lever pivoted at one end and having cam means at said pivoted end engageable with one side of the other end portion of said first named lever; and a lug on said second named lever eccentric to the pivot thereof and engageable with the opposite side of said other end portion of said first named lever.

5. In a shifting mechanism, the combination with a pivotally supported upright lever having top and bottom arms extending from the pivoted portion thereof, said bottom arm being engageable with an element to be shifted; of a second lever above said first named lever; a cam head on the inner end of said second named lever, said last named lever being pivotally supported at said inner end; and a lug on said second named lever between the ends thereof, said cam head and lug being engageable respectively with the opposite sides of the top arm of said first named lever for swinging the same in reverse directions.

6. In a shifting mechanism, the combination with an upright lever pivoted between its ends, said lever having its lower end connected to an element to be shifted; of a second lever above said first named lever, said second named lever being pivoted at its lower end for swinging movement to opposite sides of a vertical position thereof; a cam on the lower end of said second named lever engageable with one side of the upper end portion of said first named lever when said second named lever is swung to one side of said vertical position; and a lug on said second named lever between the ends thereof engageable with the opposite side of the upper end portion of said first named lever when said second named lever is swung to the other side of said vertical position.

ROLAND J. OLANDER.

References Cited in the file of this patent

UNITED STATES PATENTS

| Number | Name | Date |
| --- | --- | --- |
| 504,330 | Coldwell | Sept. 5, 1893 |
| 1,865,630 | Haseltine | July 5, 1932 |
| 2,092,104 | Bowden | Sept. 7, 1937 |
| 2,374,542 | Hansman | Apr. 24, 1945 |
| 2,423,043 | Olstad | June 24, 1947 |
| 2,436,897 | Nutt | Mar. 3, 1948 |